United States Patent
Dalla Torre (10) Patent No.: US 9,701,489 B2
(45) Date of Patent: Jul. 11, 2017

(54) DEPALLETISER FOR TRAYS OF EGGS

(71) Applicant: SANOVO TECHNOLOGY ITALIA S.r.l, Montecchio Precalcino (IT)

(72) Inventor: Marco Dalla Torre, Altivole (IT)

(73) Assignee: SANOVO TECHNOLOGY ITALIA S.r.l, Montecchio Precalcino (IT)

( * ) Notice: Subject to any disclaimer, the term of this patent is extended or adjusted under 35 U.S.C. 154(b) by 0 days.

(21) Appl. No.: 14/818,883

(22) Filed: Aug. 5, 2015

(65) Prior Publication Data

US 2016/0039618 A1  Feb. 11, 2016

(30) Foreign Application Priority Data

Aug. 8, 2014  (IT) .............................. VR2014A0207

(51) Int. Cl.
| | |
|---|---|
| *G06K 9/00* | (2006.01) |
| *B65G 59/02* | (2006.01) |
| *A01K 43/00* | (2006.01) |
| *B65G 61/00* | (2006.01) |
| *B65B 43/44* | (2006.01) |
| *B65B 43/46* | (2006.01) |
| *B65B 23/02* | (2006.01) |

(52) U.S. Cl.
CPC ............ *B65G 59/023* (2013.01); *A01K 43/00* (2013.01); *B65B 43/44* (2013.01); *B65B 43/46* (2013.01); *B65G 61/00* (2013.01); *B65B 23/02* (2013.01); *B65G 2201/0208* (2013.01); *B65G 2203/041* (2013.01)

(58) Field of Classification Search
None
See application file for complete search history.

(56) References Cited

U.S. PATENT DOCUMENTS 5,984,620 A * 11/1999 Heston ................... B65G 57/24
414/791.6
2016/0039618 A1* 2/2016 Dalla Torre ............ B65B 43/44
414/796.5

FOREIGN PATENT DOCUMENTS

EP  0712697 A2 * 5/1996
EP  0992441 A1 * 12/2000

OTHER PUBLICATIONS

Strijbos.*

* cited by examiner

*Primary Examiner* — Tahmina Ansari
(74) *Attorney, Agent, or Firm* — Ference & Associates LLC (57) ABSTRACT

Described is a depalletizer for trays of eggs, comprising a head movable in space and comprising a plurality of elements for forking a tray of eggs and a unit for controlling means for moving the head designed to control the movement of the head in space. More specifically, the depalletizer comprises image acquisition means which are facing the tray of eggs and designed to acquire at least an image of a predetermined side of the tray to be depalletized. The control unit is designed to process the image for the purpose of identifying the position in space of the empty areas of the predetermined side of the tray for insertion of the forking elements of the head.

15 Claims, 8 Drawing Sheets

DEPALLETISER FOR TRAYS OF EGGS

This invention relates to a the depalletiser for trays of eggs. More specifically, this invention relates to the sector of depalletising trays of eggs stacked on top of each other. The sector of depalletising trays of eggs regards the disassembly/transferring of a stack of trays to positioning them at final position for a subsequent processing.

According to a first prior art technique, the depalletising of eggs is performed manually. In other words, each tray or group of trays stacked is picked up by an operator and positioned in the final position in such a way as to gradually dismantle the stack.

That first prior art technique naturally has drawbacks linked above all to the time necessary for depalletising a stack of trays and the cost of the labour for performing this operation. In addition, as a group of stacked trays has a certain weight, the operator has to withstand a continuous physical effort or is forced to lift a reduced number thereby extending the time for the complete depalletising operation of a pallet of trays.

To overcome these drawbacks, a second prior art technique is used in which a depalletiser is made comprising a pneumatic handling device having a head equipped with a fork which can be inserted beneath a tray for moving one or more towards the final position. The pneumatic handling device is moved in space by an operator and comprises a system for balancing the weights loaded on the fork. This balancing system is designed to automatically balance the weight of the head with no load and to balance the weight of the trays loaded on the head using a suitable manual command triggered by the operator.

In that way, the balancing system defines an aid for the operator in relation to the movement of the trays towards the final position.

Even though this second prior art technique overcomes the problem of the physical effort of the operator linked to the lifting of the trays, it does not resolve the problems of the prolonged time needed to carry out the complete depalletising of a pallet and the respective labour costs.

Lastly, a third prior art technique uses an automatic depalletiser wherein a head equipped with forks is moved by a mechanical arm or by a gantry with movement on two axes controlled by a special control unit. In other words, the third prior art technique comprises using a robotic system to move the head in space. In this system, the control unit, knowing the position of the trays relative to the depalletiser, calculates in advance the position for picking up the trays and then moves the head to that pre-calculated position in such a way as to raise the tray and move it towards the final position.

However, this third prior art technique has several drawbacks linked to the imprecisions of the movement of the head for forking the tray. In effect, the trays stacked often do not define a perfectly vertical stack, and they might be slightly offset relative to each other or inclined. These offsets are mainly linked to imperfections of the surfaces of the trays and to deformations of the tray due also to their continuous washing at high temperatures.

Consequently, the pre-calculated position often does not coincide with the actual position for picking up a tray and, for this reason, the movement of the head towards the picking up position results in the breakage of eggs or impact against surfaces of the tray or against an interlayer shelf which separates groups of trays, In this situation, the aim of this invention is to provide a depalletiser for trays of eggs which overcomes the above-mentioned drawbacks.

More specifically, the aim of this invention is to provide a depalletiser for trays of eggs which allows the head to be moved automatically, reducing the risks of impact with the eggs or with the trays during the step of picking up the tray.

Another aim of this invention to provide a depalletiser for trays of eggs which allows to orient, automatically, the head in such a way more efficient compared with the prior art.

The above-mentioned aims are substantially achieved by a depalletiser for trays of eggs as described in the accompanying claims.

Further characteristic features and advantages of this invention will emerge more clearly from the detailed description of several preferred, but not exclusive embodiments of a depalletiser for trays of eggs illustrated in the accompanying drawings, in which.

With reference to the above-mentioned figures, the numeral 1 denotes in its entirety a depalletiser for egg supports 25 according to this invention. More specifically, the depalletiser 1 for egg supports 25 is automatic. In other words, the depalletisation occurs fully automatically, without the aid of operators (users).

It should also be noted that each egg support 25 comprises at least a tray 26 for the eggs or an interlayer shelf on which the trays 26 for eggs are loaded or another element not expressly described herein.

Each support 25 has an upper surface 27 on which the eggs are housed or at least an egg tray 26 and a lower surface 28 in which the empty areas 29 are defined for gripping the support 25.

These areas empty 29 may be defined between one support 25 and the other at a central zone of the support 25 or at a lateral zone (outer edge) of the support 25 or at both. In addition, the empty areas 29 may be defined between an interlayer shelf 32 and a support 25 or between a supporting base 34 and a support 25.

If each support 25 is identified by a tray 26, it is of shaped type and comprises a plurality of seats 30 shaped to match at least a part of an egg (preferably a lower half) at the upper surface 27 in which each seat 30 is open to contain a respective egg. The empty areas 29 are defined at the upper 27 or lower 28 surface between a row of eggs and another row adjacent to the first.

In the preferred embodiment illustrated in the accompanying drawings, each seat 30 is closed at the lower surface 28 and defines a portion 31 which extends downwards. In that case, between these portions 31 are defined the empty areas 29 in which the forking elements 5 of the depalletiser are inserted for picking up the support 25 (as explained in more detail below).

However, in other embodiments not illustrated in the accompanying drawings, the seat 30 could be open at the lower surface 28 and leave part of the egg on view. In that case, as described above, the empty areas 29 are defined between a row of eggs and another row adjacent to the first.

If each support 25 is identified by an interlayer shelf 32, it comprises empty areas 29 in which the forking elements 5 are inserted for picking up the support 25.

Preferably, the trays 26 are stacked together in such a way as to form at least one group of trays 33. Several groups of trays 33 are positioned on an interlayer shelf 32 in a position alongside each other.

It should be noted that preferably the groups of trays 33 are vertically separated by the interlayer shelves 32 relative to the other groups of trays 33 positioned above or below the first. In other words, between several groups of trays 33 there are interlayer shelves 32. Advantageously, the interlayer shelves 32 give greater stability and alignment to the trays 26 of the stack.

Moreover, all the groups of trays 26 (if necessary, with one or more interlayer shelves 32 interposed) are positioned on a same supporting base 34. Preferably, the supporting base 34 is defined by a base, pallet or other element not expressly described herein.

For this reason, following a horizontal direction, the empty areas 29 are defined between a row of eggs and another row adjacent to the first along a horizontal direction or between two recesses of the interlayer shelf 32.

Following a vertical direction, the empty areas 29 are defined between at least one tray 26 and another superposed on it, or between at least one interlayer shelf 32 and a tray 26 superposed on it, or between the supporting base 34 and a tray 26 superposed on it.

In this situation, the depalletiser 1 for egg supports 25 is positioned at a predetermined distance from the supports 25.

The depalletiser 1 comprises a mechanical arm extending between a relative base end and a relative operating end. Moreover, the depalletiser 1 comprises a working head 2 mounted on the operating end of the mechanical arm. As shown in the accompanying drawings, the head 2 comprises a clamping member 3 for connection of the head 2 to the operating end of the mechanical arm.

The working head 2 comprises a supporting frame.

In particular, the working head 2 is movable in space and is moved by the mechanical arm.

In detail, the head 2 comprises a plurality of forking elements 5 and one or more egg supports 25. The forking elements 5 are distributed along a width line L and are spaced apart from each other by a predetermined distance. Preferably, the forking elements 5 are spaced apart from each other by a distance equal to or a multiple of the distance separating one empty area 29 and the other of a support 25.

It should be noted that the set of forking elements 5 defines a sort of fork.

Preferably, each forking element 5 is defined by a tooth of the fork.

Further, each forking element 5 extends in a cantilever fashion relative to the rest of the head 2 in a direction of insertion I transversal (preferably perpendicular) to the width line L.

In addition, the depalletiser 1 comprises automatic movement means (not illustrated in the accompanying drawings as of known type) connected to the head 2 and designed to automatically move it in space. As already mentioned, the automatic movement means comprise a controlled mechanical arm.

Moreover, the depalletiser 1 comprises a movement means control unit designed to control the movement of the head 2 in space at least from a first, starting position, wherein the head 2 is spaced from the support 25, to a predetermined second position in which the head 2 is positioned near to the support 25 to be depalletised.

In detail, the head 2 movement means are designed to move the head 2 along a vertical axis and along a horizontal axis (combining the two movements).

In addition, the means for movement of the head 2 are designed to move the head 2 by angling the lying plane of the forking elements 5 of the head 2 relative to a lying plane of the supports 25. In effect, the forking elements 5 are positioned along a lying plane. In particular, the movement means are designed to move the head 2 according to a forwards and backward inclination in such a way that the direction of extension of each forking element 5 may be inclined relative to the plane in which the supports 25 lie and/or according to a lateral inclination (right and left) in such a way that the width line L along which the forking elements 5 are distributed is inclined relative to a plane in which the supports 25 lie.

In other words, the movement means are designed for moving the head 2 in space and for inclining it according to directions angled with respect to the plane in which the supports 25 lie. In that way, it is possible to obtain any positioning of the head 2 in space.

This lying plane of the supports 25 is preferably horizontal.

Moreover, the lying plane of the supports 25 coincides with the plane of the supporting base 34 (e.g. pallet) on which the supports 25 are loaded.

Moreover, it should also be noted that the control unit is designed to calculate the predetermined second position in which to position the head 2 depending on the position of the support 25 relative to the depalletiser 1. In other words, the control unit contains the ideal parameters (calculated theoretically) relating to the distance of the support 25 relative to the depalletiser, the orientation of the latter and dimensions of the latter. In that way, the control unit calculates the predetermined second position. Preferably, the calculation of the predetermined second position is performed before moving the head 2 towards second position.

In other words, the second position defines an intermediate positioning of the head 2 with respect to the supports 25 in such a way that it is positioned at a distance close to the latter, but sufficiently spaced in such a way that it may still be oriented without interfering with the support 25. More specifically, during the second position the head 2 faces a predetermined side 35 of the support 25. This predetermined side 35 is a lateral portion of the support 25 and defines the thickness of the support 25. In other words, during the second position, the head 2 is designed for stop near to the support 25 and in front of it.

It should be noted that the support 25 has a plurality of sides (as shown in FIGS. 6 to 11). Each of these sides potentially defines the predetermined side 35. Preferably, for the depalletising of a set of trays 26, the head 2 operates with a same predetermined side 35 selected beforehand according to the requirements.

According to this invention, the depalletiser 1 comprises image acquisition means 6 facing the egg support 25. The image acquisition means 6 preferably comprise one or more cameras and/or one or more video cameras and/or a combination of the two.

Alternatively, the image acquisition means 6 comprise a sensor for recognising the outline of the predetermined side 35 of the support 25 designed for detecting an image of the outline of the predetermined side 35.

In any case, the acquisition means 6 are preferably of the digital type.

Preferably, the acquisition means 6 are mounted on the head 2. In that case, the acquisition means 6 face the egg support 25 during the predetermined second position.

Preferably, the image acquisition means 6 comprise one or more lenses 7.

Each lens 7 may be positioned in any position of the head 2 (lateral or central) and faces the supports 25 at least during the predetermined second position.

The accompanying drawings show that the image acquisition means 6 comprise two lenses 7 which are respectively positioned at the lateral ends 8, 9 of the head 2 along the width line L.

More specifically, the image acquisition means 6 are designed for:
acquiring at least one image of the predetermined side 35 of the support 25 to be depalletised;
generating an image signal containing the data of the image acquired;
sending the image signal to the control unit.

In practice, the acquisition means 6 are designed for photographing the predetermined side 35 of the support 25 and for sending the photo to the control unit. Preferably, the photo is in format and is sent to the control unit using the image signal.

The control unit is designed for:
receiving the image signal;
processing the content so as to identify the empty areas 29 of the predetermined side 35 of the support 25 for inserting the forking elements 5;
commanding the movement means to orient the head 2 with an adjustment orientation in such a way as to align the forking elements 5 with the empty areas 29 identified;
moving the head 2 oriented with the adjustment orientation towards a third position in which the head 2 is inserted under the support 25 at the predetermined side 35 for transporting the support 25.

In other words, the control unit moves the head 2 as a function of the contents of the images acquired. In that way, it is advantageously possible to orient the head 2 according to a correct direction for inserting the forking elements 5 in the empty areas 29 in such a way as not to strike the structure of the support 25.

More specifically, the control unit comprises a first processing unit designed to command the movements of the head 2, and a second processing unit designed to calculate the orientation adjustment of the head 2. The first and the second processing unit may be physically positioned in different positions and be operatively connected for the exchange of electrical signals or they can be joined together in a single control unit.

In this way, the second processing unit receives the image signal and processes the content so as to identify the empty areas 29 of the predetermined side 35 of the support 25. Moreover, the second processing unit is designed for calculating spatial coordinates of the orientation adjustment of the head 2 in such a way as to align the forking elements 5 with the empty areas 29 identified.

The second processing unit then sends to the first processing unit the coordinates calculated so that the first processing unit commands the movement means to orient the head 2 with the adjustment orientation.

In other words, the control unit (and in detail the second processing unit) processes the following data:
image acquired of the predetermined side 35 of the support 25;
known distance (preferably calculated after the preliminary calibration operation described below) of the head 2 (in the second position) relative to the support 25;
known distance (preferably calculated after the preliminary calibration operation described below) of the acquisition means 6 relative to the head 2 or relative to the support 25.

After processing this data, the control unit (and in detail the second processing unit) is able to calculate the coordinates of the empty areas 29 of the support 25. The control unit (and in detail the first processing unit) then correctly orients the head 2 in such a way that each forking element 5 inserts into a respective free area.

More in detail, the control unit is designed to perform a preliminary calibration operation of the image acquisition means. More specifically, the calibration operation comprises the following operating steps:
positioning the forking elements 5 in the third position;
moving the forking elements 5 towards the second position along a predetermined line in space and by a predetermined distance;
acquiring a reference image of the support 25;
calculating the position in space of the image acquisition means 6 relative to the forking elements 5.

Advantageously, the preliminary calibration operation makes it possible to know the exact positioning of the image acquisition means 6 relative to the forking elements 5. In effect, by knowing the predetermined line in space and the predetermined distance it is possible to calculate the exact positioning of the acquisition means 6 relative to the forking elements 5. Moreover, the control unit is designed to carry out a comparison the position in space calculated during the calibration operation with the position in space of the acquisition means 6 in the predetermined second position during every pick up operation of one or more supports 25.

More specifically, the control unit provides the coordinates of the position in space of the acquisition means 6 in the predetermined second position from the image acquired in that position. In that way, it is advantageously possible to obtain a contact in relation to the position of the acquisition means 6 relative to the position in space obtained during the calibrating step.

Overall, that the control unit commands the movement means to orient the head 2 with the adjustment orientation depending on the position in space of the head 3, the position in space of the support 25 and the position in space of the acquisition means 6.

Preferably, the control unit is designed to acquire the image of the support 25 to be depalletised after the head 2 has been positioned in the predetermined second position.

In that way, in the preferred case wherein the acquisition means 6 are mounted on the fork, it is possible to acquire images from a distance close to the support 25 and known since the control unit knows the predetermined second position.

It should be noted that the control unit is designed for moving the head 2 (using suitable movement controlling means) from the second position to the third position in which the forking elements 5 are inserted in the free areas under the support 25. Moreover, the control unit is designed to lift the support 25 (one or more) after positioning the head 2 in the third position to move it towards a final position.

Figure 1:
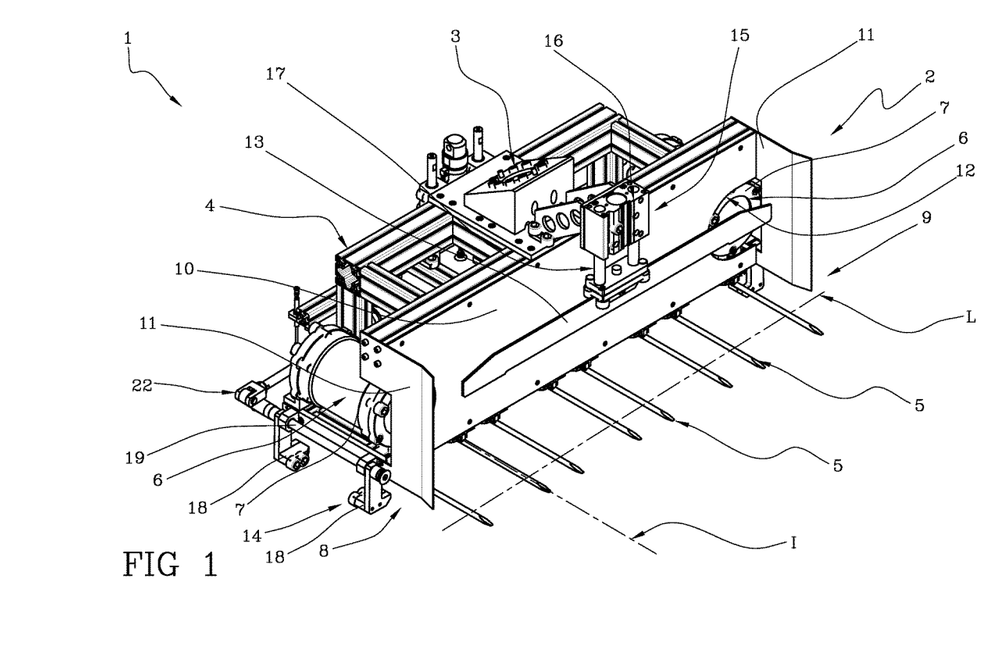
FIG. 1 is a front perspective view of a head of the depalletiser for trays of eggs according to this invention.
Figure 2:
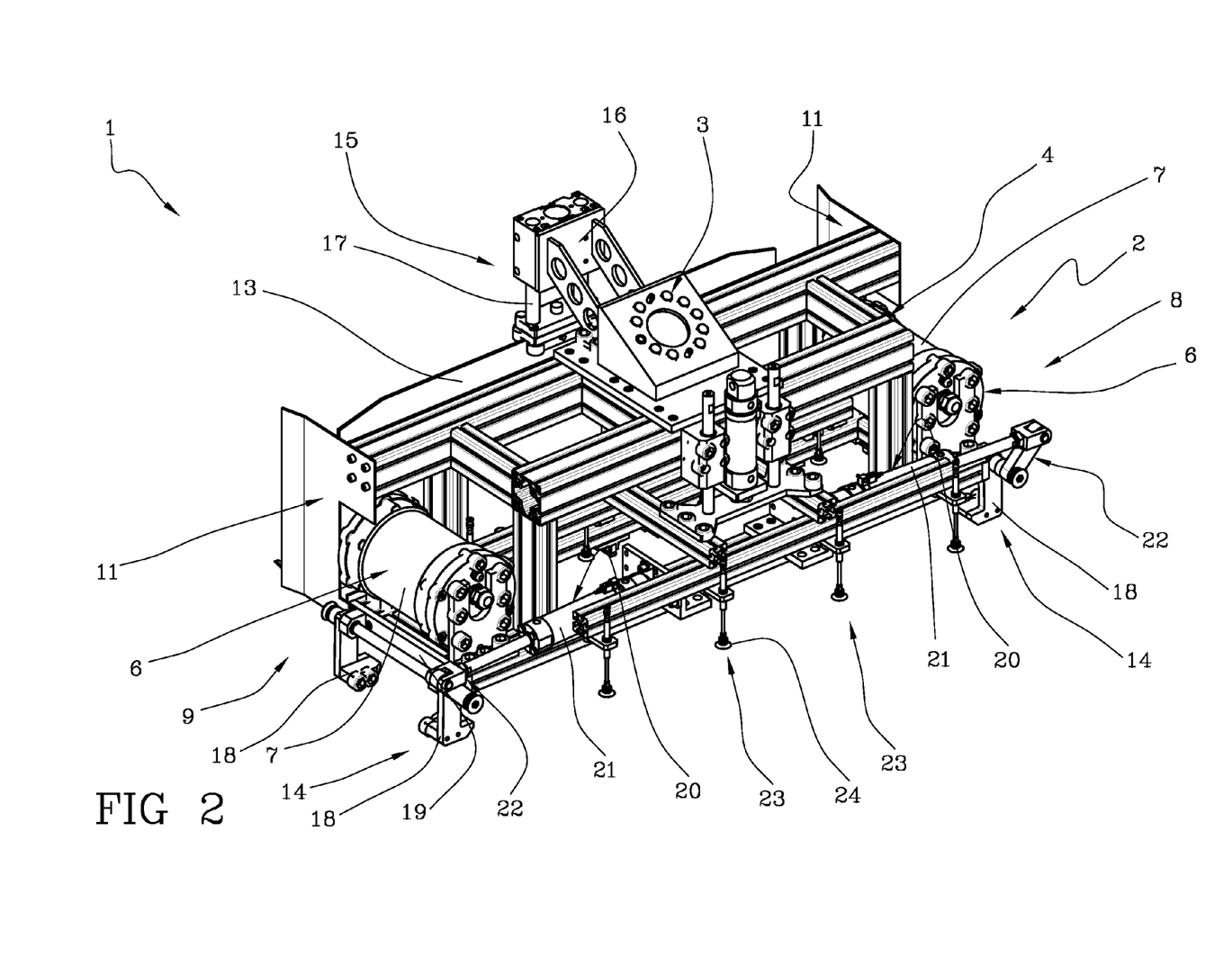
FIG. 2 is a rear perspective view of the head of the depalletiser of FIG. 1.
Figure 3:
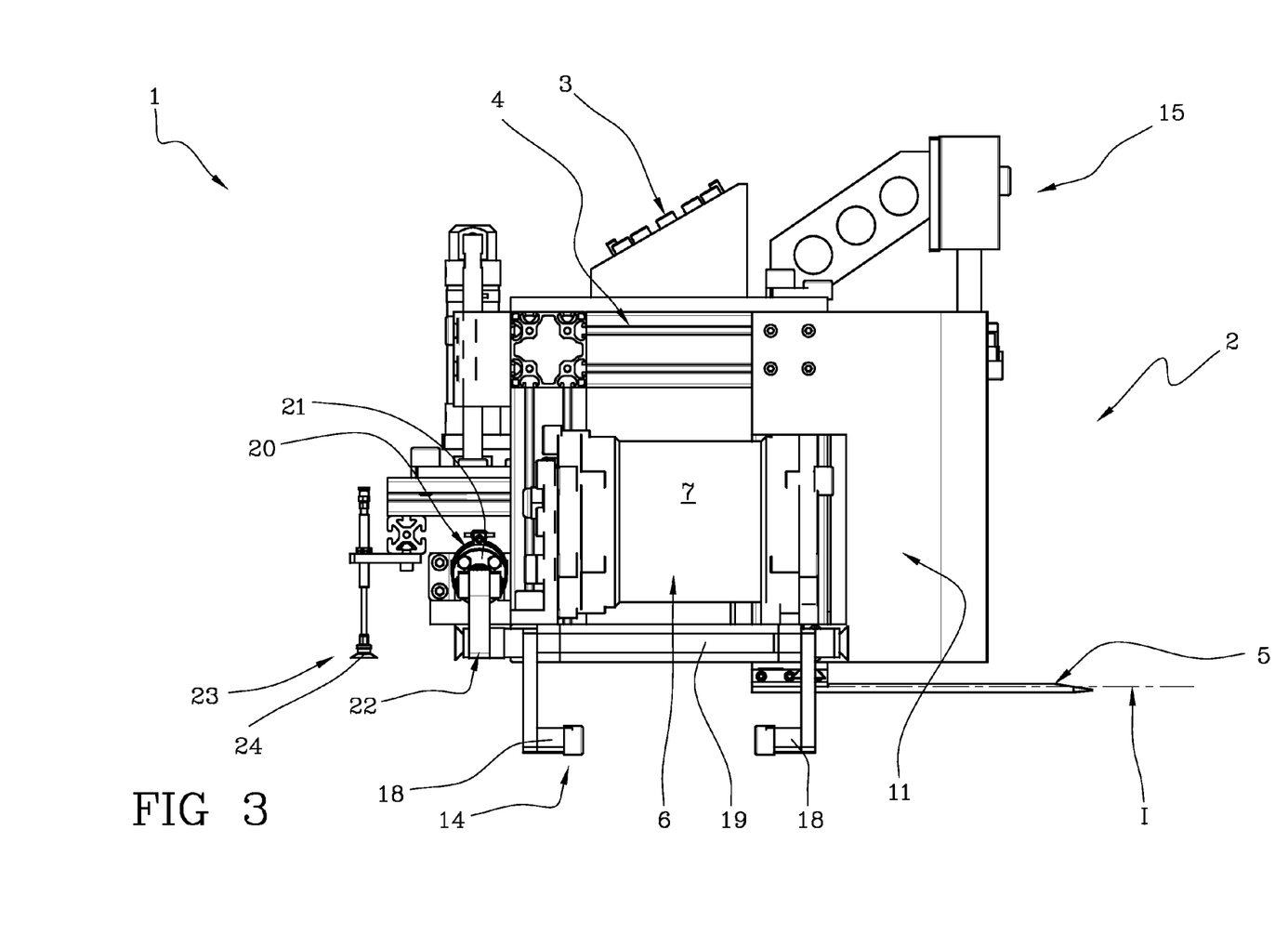
FIG. 3 is a side view of the head of the depalletiser of FIG. 1.
Figure 4:
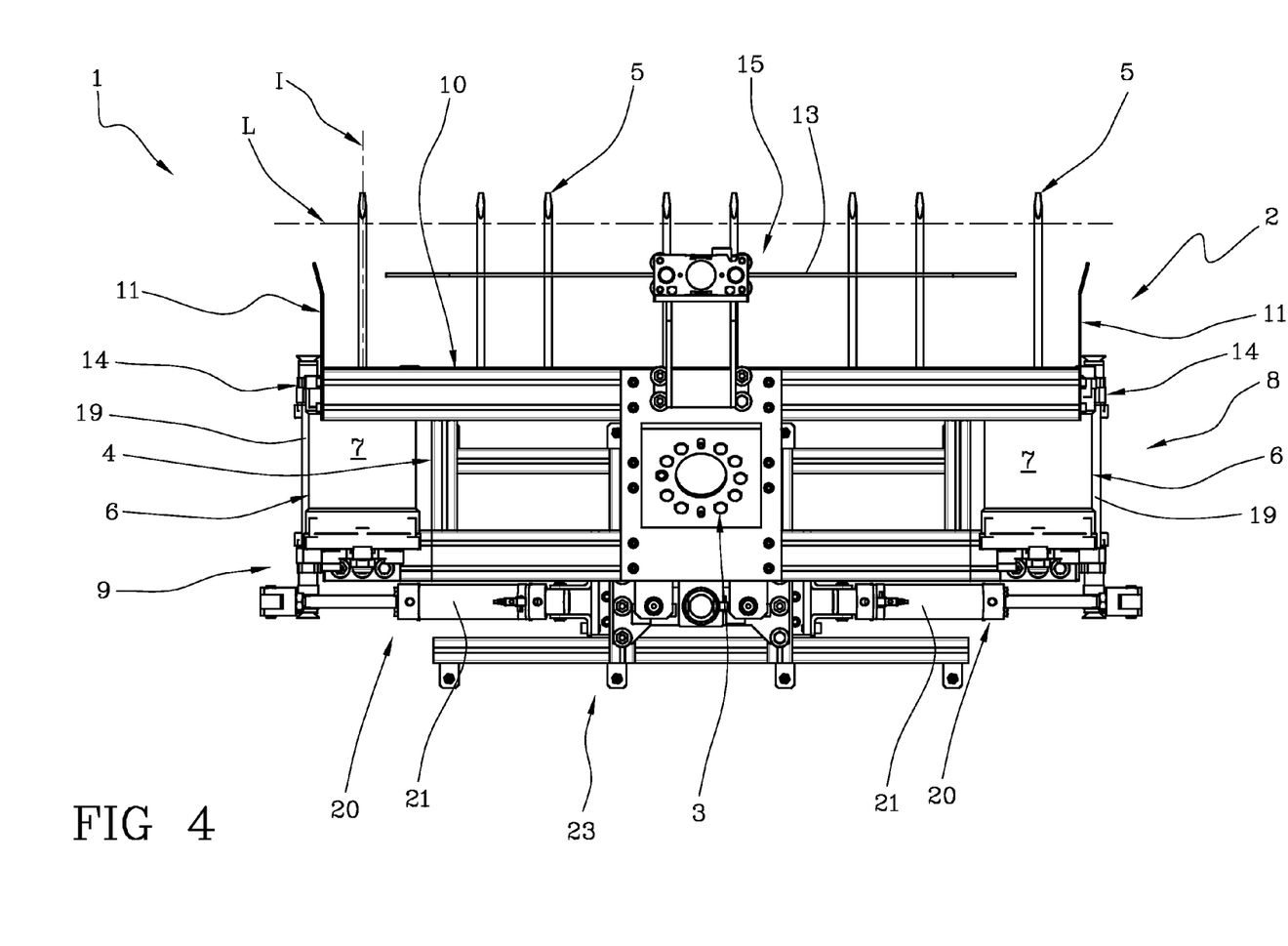
FIG. 4 is a view from above of the head of the depalletiser of FIG. 1.
Figure 5:
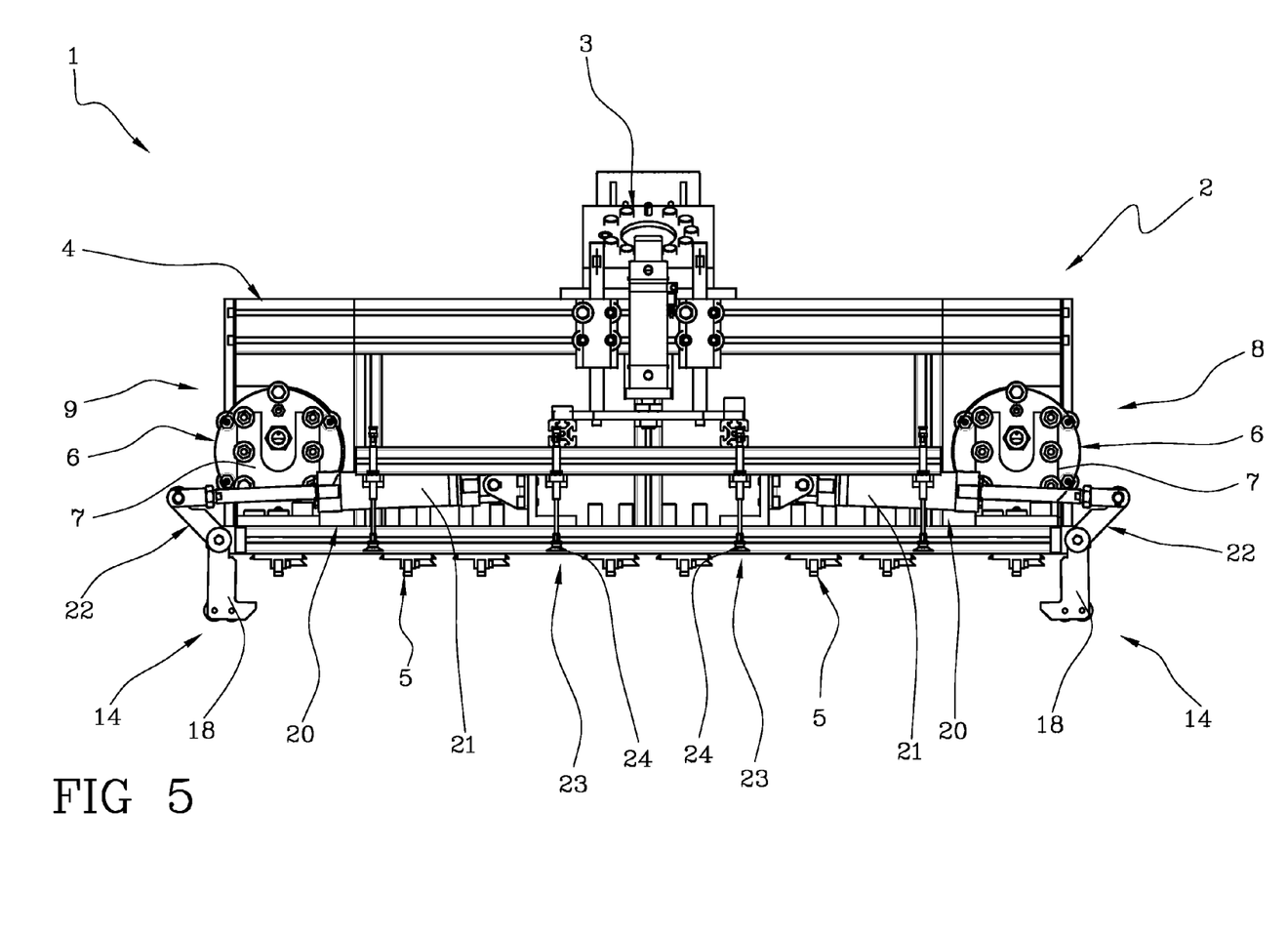
FIG. 5 is a rear view of the head of the depalletiser of FIG. 1.
Figure 6:
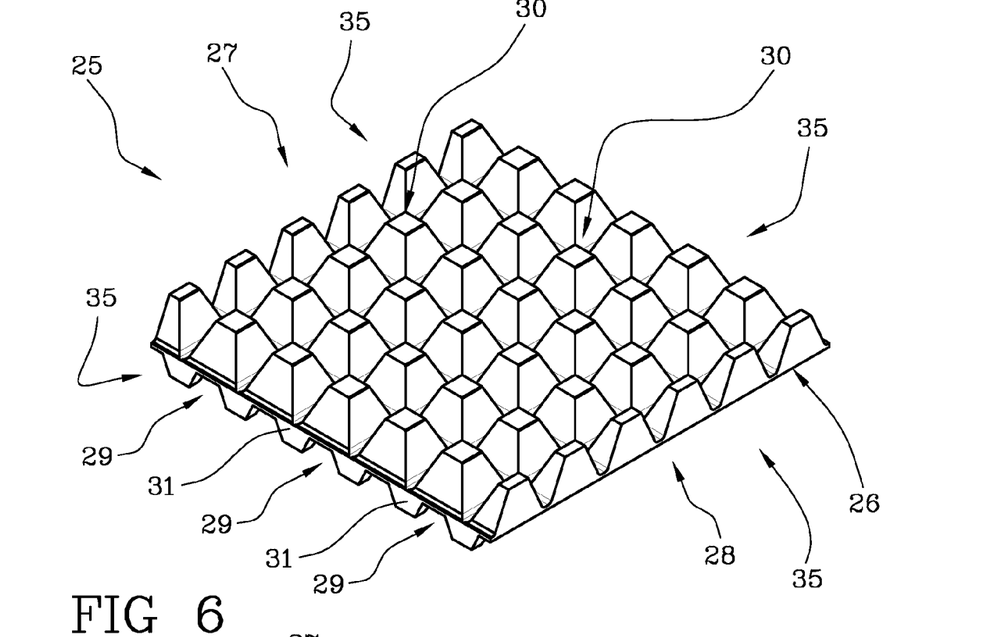
FIG. 6 is a perspective view from above of a tray for eggs which is forked by the head of the depalletiser of FIG. 1.
Figure 7:
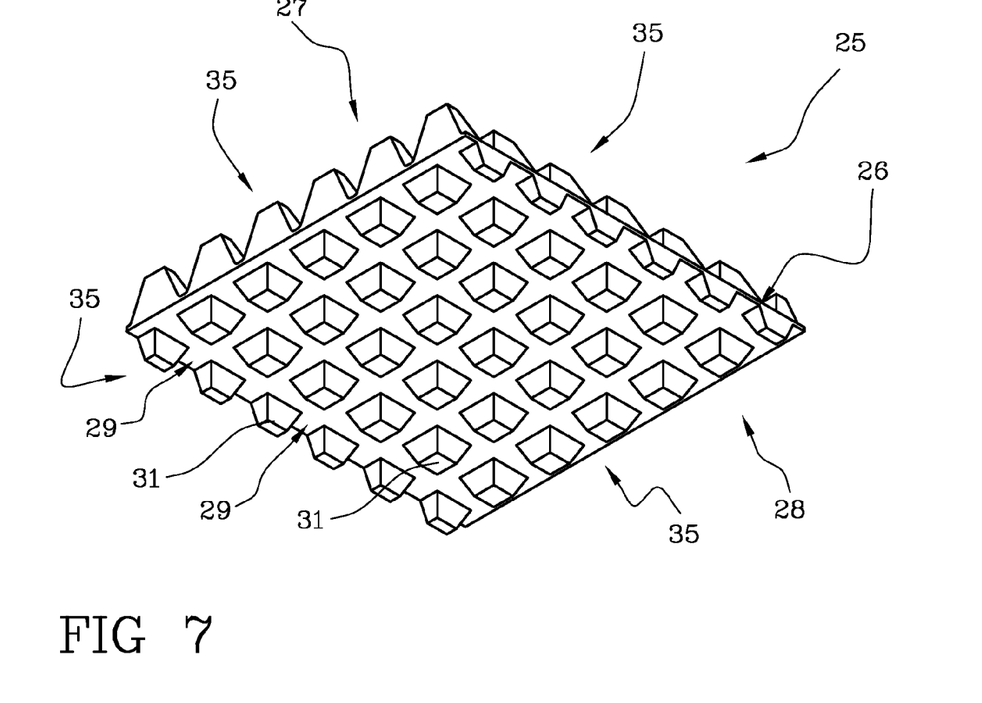
FIG. 7 is a perspective view from below of the tray for eggs illustrated in FIG. 6.
Figure 8:
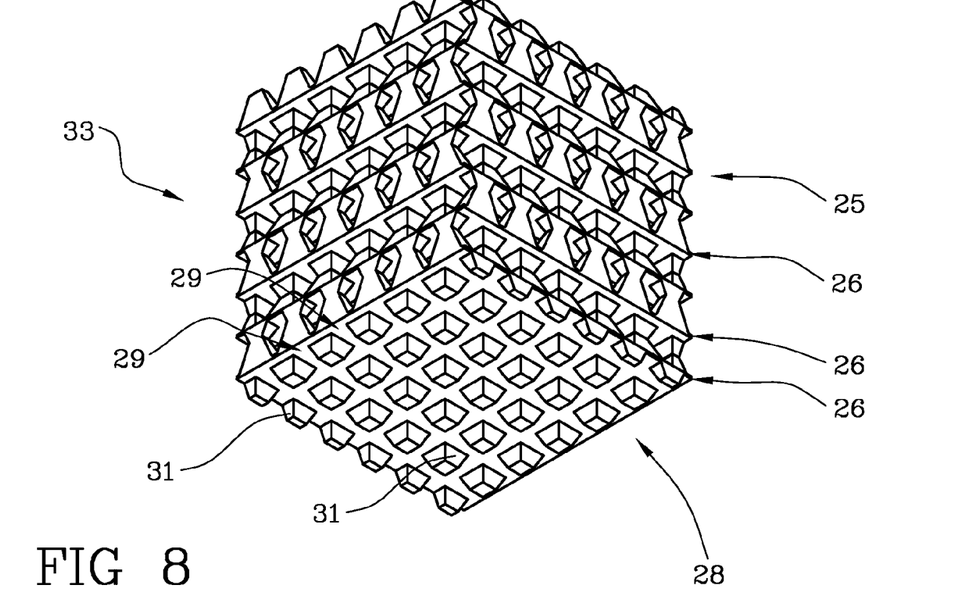
FIG. 8 is a perspective view from below of a stack of trays illustrated in FIG. 6.
Figure 9:
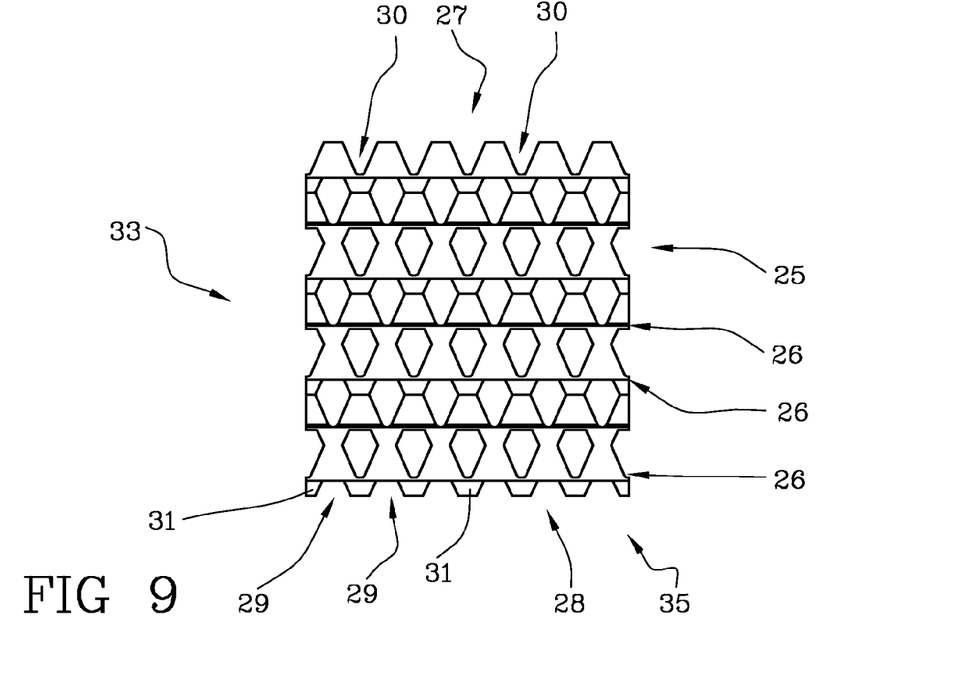
FIG. 9 is a side view of the stack of trays illustrated in FIG. 8.
Figure 10:
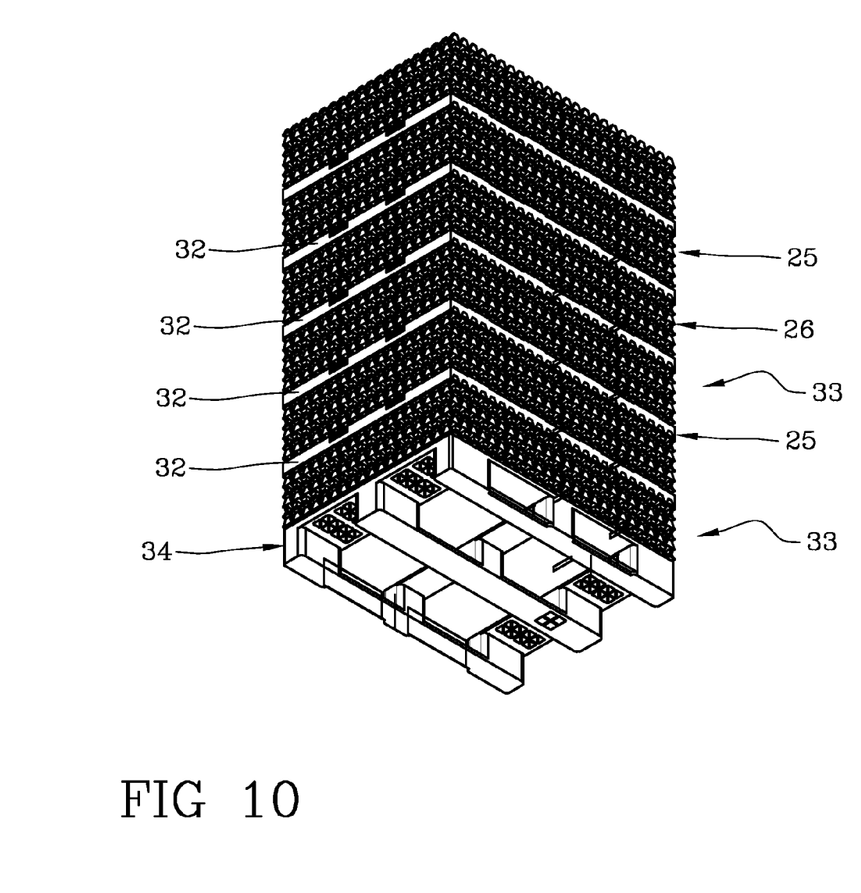
FIG. 10 is a perspective view of several stack of trays illustrated in FIG. 8 and separated by the interlayer shelves.
Figure 11:
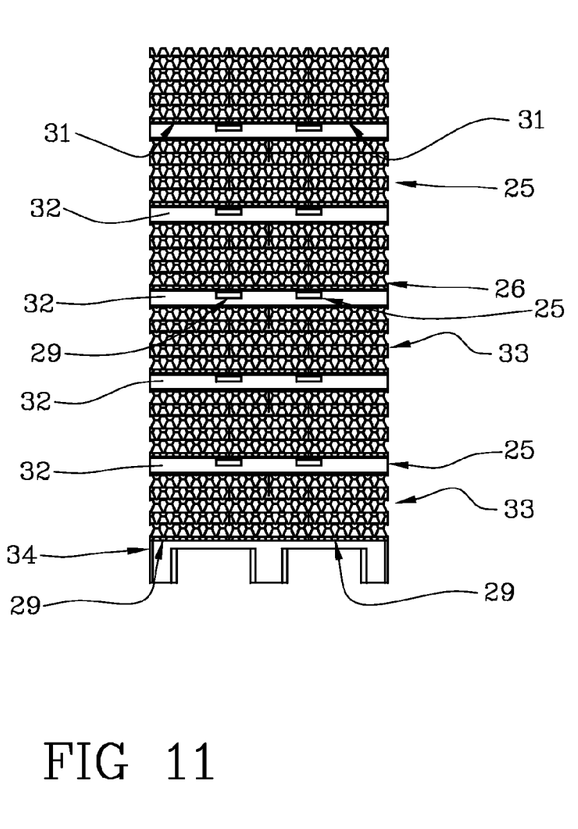
FIG. 11 is a side view of several stacks of trays of FIG. 10.

Moreover, as may be seen in FIG. 1, the head 2 comprises a contact surface 10 extending along the width line L of the forking elements 5 and positioned at the base of the latter.

In the preferred embodiment illustrated in the accompanying drawings, the head 2 comprises two lateral surface 11 positioned at the lateral ends 8, 9 of the head 2 along the width line L and each extending along a direction substantially parallel to the direction of insertion I.

More specifically, each lateral surface 11 defines together with the contact surface 10 a surface which is continuous and preferably shaped to match the edge of the support 25.

Moreover, the contact surface 10 has at least one hole 12 in which the image acquisition means 6 are inserted. Preferably, the contact surface 10 has two holes 12 positioned at the lateral ends 8, 9 at each of which a respective lens 7 of the image acquisition means 6 is inserted.

Each lens 7 of the image acquisition means 6 extends from a rear area of the head 2 towards the contact surface 10 along a direction of approach to the forking elements 5.

Moreover, the depalletiser 1 comprises a locking device 13 connected to the head 2 and positioned above the forking elements 5. More specifically, the locking device 13 is located in a position spaced from the contact surface 10 in a direction substantially parallel to the direction of insertion I. The locking device 13 is movable between a home position and an operating position in which it locks the support 25 in the third position to hold it stationary in position during a subsequent movement.

Preferably, the locking device 13 is movable from a position away from the forking elements 5 to a position near to the forking elements 5. During this close position the locking device 13 engages the support 25 in order to keep it stationary.

The control unit is designed for moving the locking device 13 from the far position to the near position following the positioning in the third position of the fork.

As shown in FIG. 1, the depalletiser 1 comprises a unit 15 for moving the pallet connected to the latter. The movement unit 15 comprises a fixed guide 16 and a portion 17 slidable in the guide 16. The control unit is connected to the movement unit 15 to control the movement of the locking device 13.

In addition, the depalletiser 1 comprises retaining means 14 for a supporting base 34 and/or for an interlayer shelf 32 connected to the head 2 (preferably in a position below the latter) and designed to retain a supporting base 34, in order to raise it, once the stack of supports 25 has ended.

Preferably, the retaining means 14 comprise a plurality of L-shaped elements 18 each having one end rotatably connected to the head 2 in such a way that the other end of the head 2 is rotatable about an axis of rotation for attaching the supporting base 34 or the interlayer shelf 32.

Preferably, the retaining means 14 comprise four L-shaped elements 18 connected in pairs to respective bars 19 rotatable about respective axes of rotation parallel with each other. Each bar 19 is rotated by rotation means 20.

The rotation means 20 preferably comprise a pair of respective pneumatic cylinders 21 each of which is connected to a respective bar 19 using an interposed transmission element 22.

In this way, when the L-shaped elements 18 are moved towards each other the pallet is picked up, whilst when L-shaped elements 18 are moved away from each other the supporting base 34 or the interlayer shelf 32 is released.

The control unit is designed to control the movement of the "L" elements in such a way to pick up or release the supporting base 34 or the interlayer shelf 32.

Moreover, the depalletiser 1 comprises means 23 for picking up the interlayer shelves 32 connected to the head 2 designed for picking up an interlayer shelf 32.

These pickup means 23 are preferably located in a lower and withdrawn position with respect to the forking elements 5. However, in other embodiments not illustrated in the accompanying drawings, the pickup means 23 might be positioned in an upper position relative to the head 2 or in an intermediate position relative to the head 2 depending on requirements.

Moreover, the pickup means 23 comprise one or more pickup units.

Preferably, the pickup means 23 comprise a plurality of suction cups 24. The pickup means 23 are preferably movable along a vertical direction to protrude towards the interlayer shelves 32 (to be picked up) with respect to the dimensions of the head 2 or to withdraw inside the dimensions of the head 2 moving away from the interlayer shelves 32.

Preferably, the control unit comprises an electronic processor of the microprocessor type.

This invention also relates to a method for depalletising egg supports 25. The method is derived directly from what is described above, which is herebelow incorporated in its entirety.

More specifically, the method comprises a step of moving the head 2 from the first starting position to the predetermined second position in which the head 2 is positioned near to the support 25 and facing it.

The method then comprises a step for acquiring at least one image of the predetermined side 35 of the support 25 in which the head 2 is to be inserted.

The method then comprises processing the image acquired so as to identify the empty areas 29 of the predetermined side 35 of the support 25 for insertion of the forking elements 5. This is followed by a step for orienting the head 2 in the adjustment orientation in such a way as to align the forking elements 5 with the empty areas 29 identified.

For this reason, the method comprises moving the head 2 oriented in the adjustment orientation towards a third position in which the head 2 is inserted under the support 25 at the predetermined side 35 for transporting the support 25.

More specifically, the step of orienting the head 2 in the adjustment orientation is carried out depending on the position in space of the fork 2, the position in space of the support 25 and the position in space of the acquisition means 6.

As described above, the calculation of the position in space of the acquisition means 6 comprises a sub-step of comparing the position in space of the acquisition means 6 obtained from the image acquired with the position in space obtained during a preliminary calibration step. This preliminary calibration step comprises, in turn, the following sub-steps:

positioning the forking elements 5 in the third position;
moving the forking elements 5 towards the second position along a predetermined line in space and by a predetermined distance;
acquiring a reference image of the support 25;
calculating the position in space of the image acquisition means 6 relative to the forking elements 5.

This calculation of the position is made from the reference image acquired. Moreover, the step of orienting the head 2 comprises a sub-step of moving the head 2 by angling the lying plane in which the forking elements 5 are positioned relative to the lying plane of the supports 25.

In the preferred embodiment illustrated in the accompanying drawings, the step of acquiring the image comprises the acquisition of two images at opposite ends of the head 2 along a width line L along which the teeth are distributed.

In detail, the step of acquiring the image of the support 25 to be depalletised is carried out after the head 2 has been positioned in the predetermined second position.

The present invention achieves the set aims.

In particular, thanks to the acquisition of the images relating to the side of the support 25 it is possible to know the actual positioning of the empty areas 29 in such a way as to correctly reposition the head so as to insert the forking elements in these empty areas without the risk of striking the eggs or the supports 25.

In effect, the images are processed by the control unit which correctly orients the head before forking the support 25.

Moreover, this invention speeds up the depalletising operations as the direct intervention of an operator is not necessary. Consequently, this invention allows the labour costs for the depalletising operations to be optimised.

In effect, thanks to this invention, the depalletisation occurs in a fully automatic and controlled fashion.

It should also be noted that this invention is relatively easy to implement and that the cost of implementing the invention is relatively low.

The invention claimed is:

1. A depalletiser for egg supports, comprising:
   a head movable in space and comprising a plurality of forking elements for an egg support;
   automatic movement means connected to the head and configured to automatically move it in space;
   a movement means control unit configured to control the movement of the head in space at least from a first, starting position to a predetermined second position in which the head is positioned near to the support to be depalletised;
   image acquisition means which are facing the egg support and configured to:
      acquire at least one image of a predetermined side of the support to be depalletised, wherein the image acquisition means is configured to acquire the image of the support to be depalletised after the head has been positioned in the predetermined second position;
      generate an image signal containing the data of the image acquired;
      send said image signal to an image acquisition control unit;
   said image acquisition control unit being configured to:
      receive the image signal;
      process the content so as to identify the empty areas of the predetermined side of the support for insertion of the forking elements of the head;
      command the movement means to orient the head with an adjustment orientation moving the head in space or inclining it relative to a plane in which the supports lie in such a way as to align the forking elements of the head with the empty areas identified; and
      move the head oriented with the adjustment orientation towards a third position in which said head is inserted under the support at the predetermined side for transporting said support.

2. The depalletiser according to claim 1, wherein the control unit commands the movement means to orient the head with the adjustment orientation depending on the position in space of the head, the position in space of the support and the position in space of the acquisition means.

3. The depalletiser according to claim 2, wherein the control unit is configured to calculate the position in space of the acquisition means from the image acquired relative to a position in space obtained during a preliminary calibration operation; during said preliminary calibration operation, the control unit being configured to:
   position the forking elements in the third position;
   move said forking elements towards the second position along a predetermined line in space and by a predetermined distance;
   acquire a reference image of the support; and
   calculate the position in space of the image acquisition means relative to the forking elements from the reference image acquired.

4. The depalletiser according to claim 1, wherein the head movement means are configured to move the head along a vertical axis and along a horizontal axis.

5. The depalletiser according to claim 1, wherein the forking elements are positioned along a lying plane; said head movement means being configured to move the head by angling the lying plane relative to a lying plane of the supports.

6. The depalletiser according to claim 1, wherein the image acquisition means are connected to the head and move with it.

7. The depalletiser according to claim 6, wherein the forking elements are distributed along a width line of the head; said image acquisition means comprising two lenses which are respectively positioned at the lateral ends of the width line.

8. The depalletiser according to claim 1, wherein the control unit is configured to calculate the predetermined second position in which to position the head depending on the position of the support relative to the depalletiser.

9. The depalletiser according to claim 1, further comprising a locking device connected to the head and positioned above said head; said locking device being movable between a home position and an operating position in which it locks the support in the third position to hold it stationary in position during a subsequent movement.

10. The depalletiser according to claim 1, wherein the forking elements are distributed along a width line and are spaced apart from each other by a predetermined fixed distance; the control unit being configured to drive the movement means for orienting the head with an adjustment orientation while keeping the same distance between each forking element and the next.

11. A method for depalletising an egg support comprising:
   moving, using a control unit of a movement means, a head connected to a mechanical arm, from a first, starting position to a predetermined second position in which the head is positioned near to the support and facing it;
   acquiring, using an image acquisition means, at least one image of a predetermined side of the support in which the head is to be inserted, wherein the acquiring comprises acquiring the image of the support to be depalletised after the head has been positioned in the predetermined second position;
   processing, using an image acquisition control unit, the image acquired so as to identify the empty areas of the predetermined side of the support for insertion of the forking elements;

orienting, using the control unit of a movement means, the head with an adjustment orientation moving the head in space or inclining it relative to a plane in which the supports lie in such a way as to align the forking elements with the empty areas identified; and moving, using the control unit of a movement means, the head oriented with the adjustment orientation towards a third position in which said head is inserted under the support at the predetermined side for transporting said support.

12. The method according to claim 11, wherein orienting the head with the adjustment orientation is carried out depending on the position in space of the head, the position in space of the support and the position in space of the acquisition means.

13. The method according to claim 12, further comprising:

calculating the position in space of the acquisition means from the image acquired relative to a position in space obtained during a preliminary calibration, and wherein said preliminary calibration comprises:

positioning the forking elements in the third position;

moving said forking elements towards the second position along a predetermined line in space and by a predetermined distance;

acquiring a reference image of the support;

calculating the position in space of the image acquisition means relative to the forking elements from the reference image acquired.

14. The method according to claim 11, wherein orienting the head comprises a sub-step of moving the head by angling the lying plane in which the forking elements of the head are positioned relative to a lying plane of the supports.

15. The method according to claim 11, wherein acquiring the image comprises the acquisition of two images at opposite ends of the head along a width line along which the teeth are distributed.

* * * * *